Feb. 23, 1954
W. P. HILL
2,669,893
FIN FORMING ROLL
Original Filed Sept. 25, 1950
3 Sheets-Sheet 1
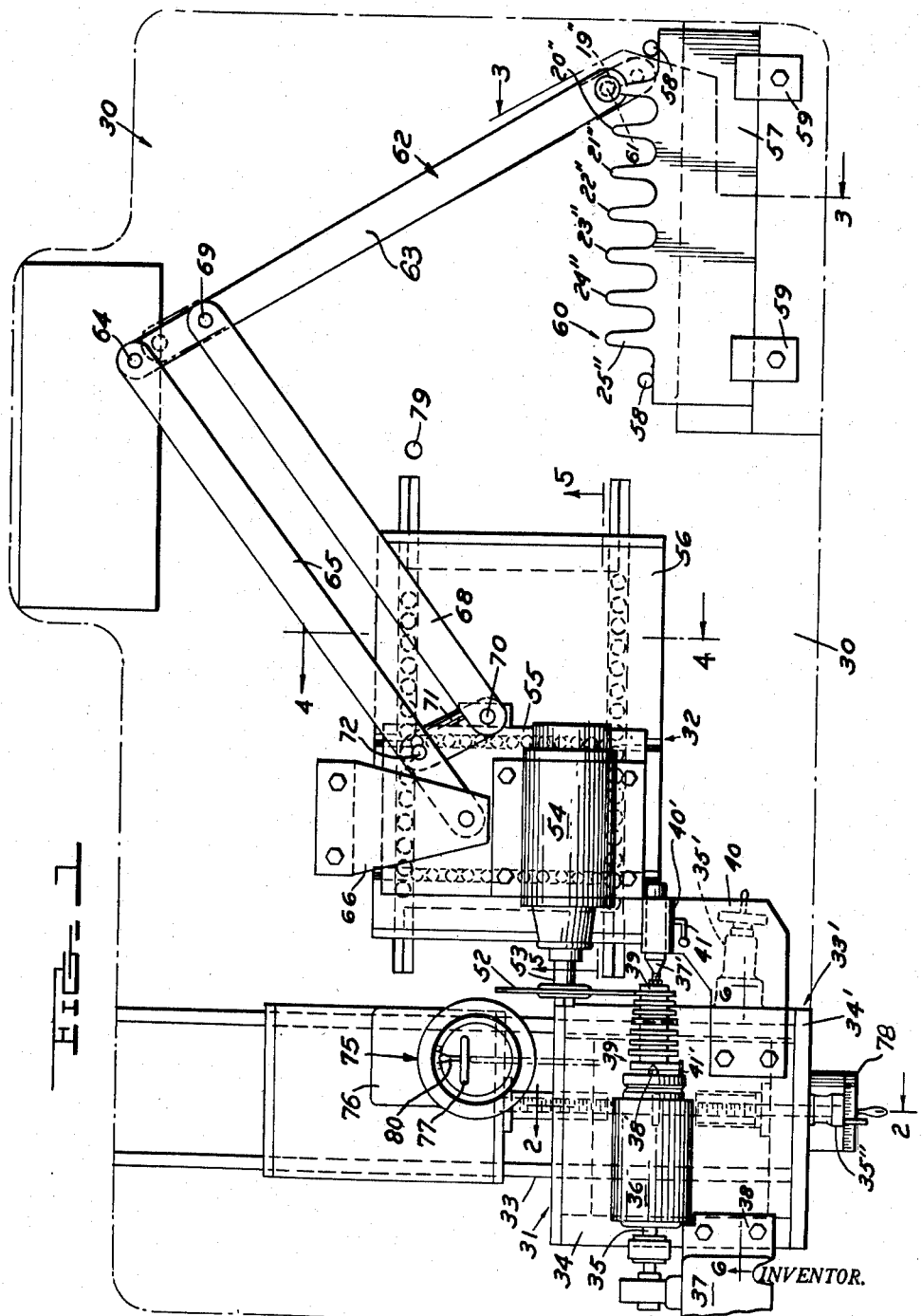
INVENTOR.
BY WALTER P. HILL
ATTORNEYS Feb. 23, 1954 W. P. HILL 2,669,893
FIN FORMING ROLL
Original Filed Sept. 25, 1950 3 Sheets-Sheet 2
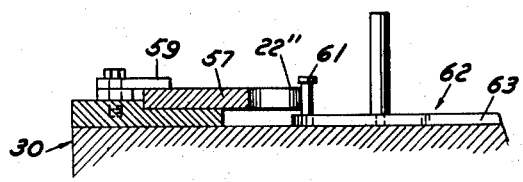
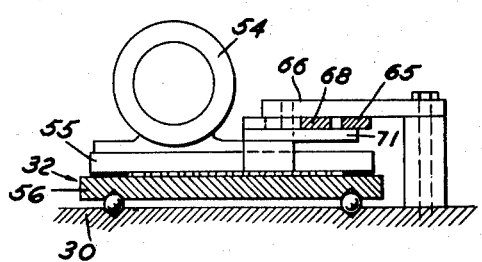
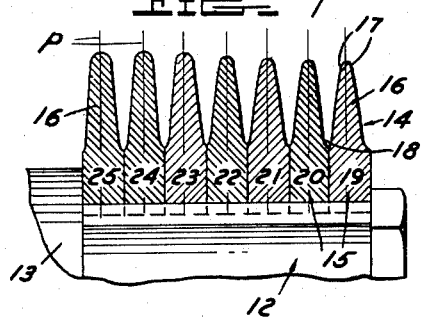
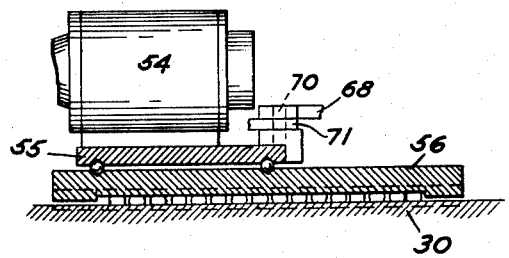
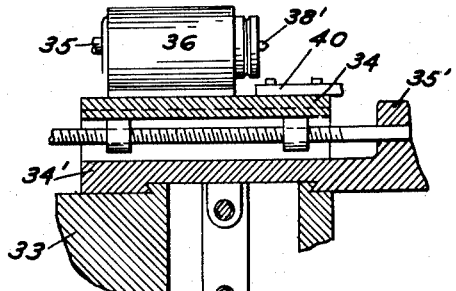
INVENTOR.
WALTER P. HILL
BY
Whitmore Hulbert & Belknap
ATTORNEYS Feb. 23, 1954
W. P. HILL
2,669,893
FIN FORMING ROLL
Original Filed Sept. 25, 1950
3 Sheets-Sheet 3
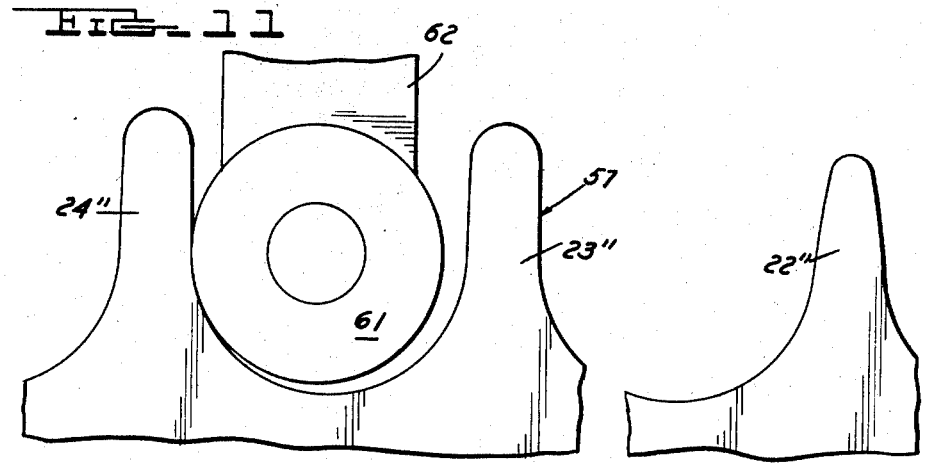
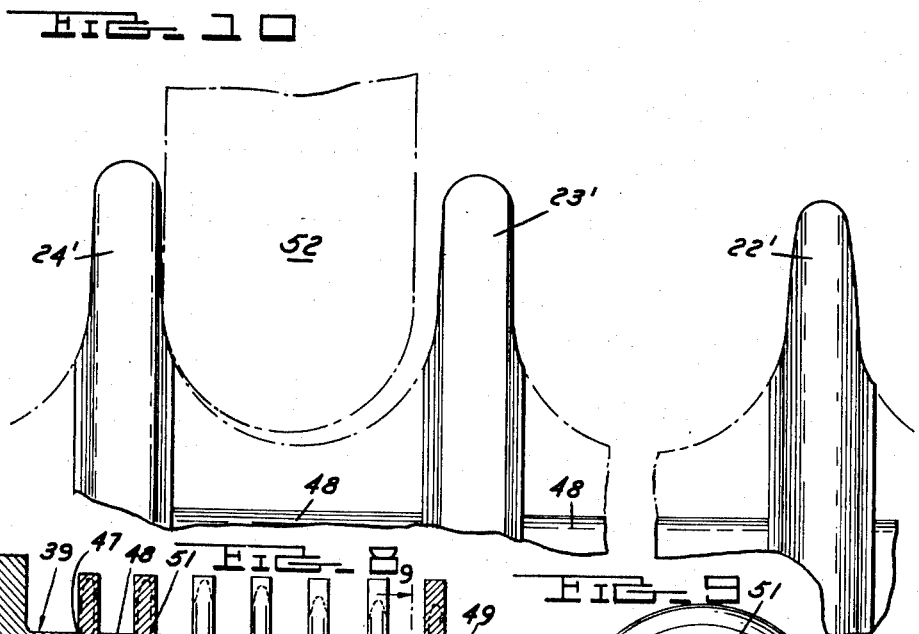
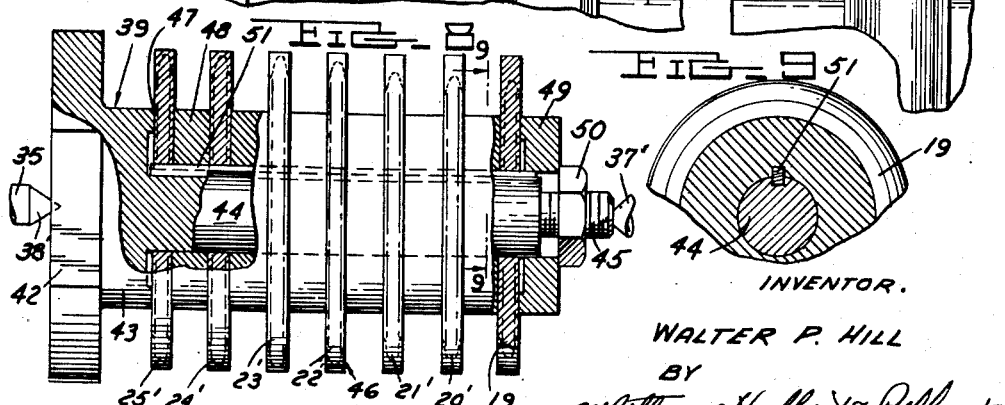
INVENTOR.
WALTER P. HILL
BY
ATTORNEYS Patented Feb. 23, 1954

2,669,893

UNITED STATES PATENT OFFICE 2,669,893

FIN FORMING ROLL

Walter P. Hill, Pontiac, Mich., assignor to Calumet & Hecla, Inc., a corporation of Michigan Original application September 25, 1950, Serial No. 186,597. Divided and this application January 29, 1951, Serial No. 208,301

6 Claims. (Cl. 80—53)

This invention relates to an improved roll for use in the manufacture of integral finned tubing and is a division of my copending application, Serial No. 186,597, filed September 25, 1950, now Patent No. 2,610,452.

Rolls of the general type forming the subject matter of this invention are shown in the Walter P. Hill Patent No. 2,508,518, dated May 23, 1950; and are highly satisfactory for use in the production of tubing having an integral helically extending fin of substantial height projecting outwardly from the peripheral surface of the tubing. In the manufacture of such finned tubing, three forming rolls are usually employed, and these rolls are rotatably supported with their axes spaced from each other equal distances around a length of tubing. The axes of the rolls are inclined with respect to the axis of the length of tubing at an angle corresponding to the mean helix angle of the fin to be formed on the length of tubing, and the rolls are driven in tracking relationship about their respective axes.

In operation, the rolls or peripheral edges of the discs apply a radially inwardly directed pressure on axially spaced helically aligned portions of the outer surface of the length of tubing, causing material from the outer surface of the tubing to flow or extrude outwardly into the annular grooves between adjacent discs. In cases where the helix angle of the fin is very small in order to obtain a large number of fin convolutions per unit of length of the tubing, and where the outside diameter of the fin is large in comparison to the root diameter of the fin, difficulty is encountered in passing the peripheral portions of the discs through the helicoidal path provided between adjacent convolutions of the fin being formed without displacing the fin convolutions axially of the tube. Such interference causes the fin convolutions to move back and forth along the tube axis during the forming or rolling operation and not only unduly wears the roll discs, but in addition, work hardens the material to such an extent that any attempt to raise a high fin from the tube fractures either or both the fin and tube. The above objection may be overcome by contouring the side surfaces of revolution of the individual discs, so that the peripheral portions of the latter will pass relatively freely through the helicoidal path between adjacent convolutions of the fin during the forming operation.

In the Walter P. Hill Patent No. 2,508,518 the opposite side surfaces of revolution of the discs converge toward the outer edges of the discs and are convex in contour radially of the discs. This contour provides the relief required for the peripheral portions of the discs to pass relatively freely through the helicoidal path between adjacent convolutions of the fin, and thereby avoid the interference noted above.

Although forming rolls composed of contoured fin forming discs of the above type render it possible to produce integral high finned tubing on a production basis, difficulty has been encountered in forming the rolls with the accuracy required for optimum results. Owing to the fact that in such forming rolls the annular space existing between adjacent discs is very small, it is not feasible to provide a grinding wheel thin enough to operate within this space. Accordingly, it is not practical to form grind the discs while assembled in roll formation, and it has been the practice to individually form grind the discs prior to assembling the same. More particularly, the contoured work performing side surfaces of the discs were form-ground with reference to one of both flat ends of the hub portions of the discs, and subsequent to the grinding operation, the discs were grouped in assembled relationship to form the roll.

It follows from the above that allowable manufacturing errors in grinding the individual discs, although small, nevertheless become accumulative when the discs are secured in assembled relationship; and in some cases, the accumulative error which may be different for each roll of the series, is sufficient to cause the interference discussed above between the discs and fin convolutions during the rolling operation.

With the above in view, it is an object of this invention to simplify and reduce the cost of forming the roll discs as well as eliminate the accumulative error referred to in the preceding paragraph. This is accomplished according to the present invention by forming or contouring the peripheral portions of a group of roll discs while the latter are supported in substantial spaced relationship in the same order they later assume when assembled to provide a forming roll. More particularly, a plurality of disc blanks corresponding in number to the number of preformed discs of a roll are supported on an arbor with adjacent discs spaced axially from one another a distance sufficient to accommodate a forming tool such as a grinding wheel. The tool and arbor are relatively moved in directions to engage the tool with opposite sides of successive blanks. A preformed template is provided for controlling the path of relative movement of the tool and arbor so that the peripheral portions of the blanks are successively fashioned to the specified contour of the finished roll discs regardless of variations in thickness of the discs. The finished discs are then removed from the arbor and are secured together in juxtaposition in the same sequence they assumed during the forming operation. By following this procedure in forming each set of rolls employed to extrude a helical fin from a length of tubing, bending of the convolutions of the fin during the forming operation by reason of inaccuracies in the manufacture of the roll discs is reduced to a minimum. Also a superior finned tube is produced with less wear on the discs and maintenance costs are accordingly reduced.

It is a further object of this invention to provide an arrangement whereby one or more discs may be replaced in the group of discs forming the roll without destroying the accuracy of the roll. In accordance with this invention, when it is desired to replace a disc, all of the usable original discs are again assembled on the tool arbor in the same relationship they assumed during the original forming operation, and the replacement disc blank is installed on the arbor in the position previously occupied by the disc it replaces. Thus all of the discs are subjected to the finishing operation, so that the replacement disc or discs will have the same relationship to the remaining discs as the original discs.

The foregoing as well as other objects will be made more apparent as this description proceeds, especially when considered in connection with the accompanying drawings, wherein:

Figure 1 is a semi-diagrammatic plan view of apparatus embodying the features of this invention;

Figure 2 is a sectional view taken on the line 2—2 of Figure 1;

Figures 3, 4 and 5 are respectively sectional views taken on the lines 3—3, 4—4 and 5—5 of Figure 1;

Figure 6 is a sectional view taken on the line 6—6 of Figure 1;

Figure 7 is an enlarged longitudinal sectional view through a part of a forming roll constructed in accordance with this invention;

Figure 8 is an enlarged side elevational view, partly in section, of a part of the apparatus shown in Figure 1;

Figure 9 is a sectional view taken on the line 9—9 of Figure 8;

Figures 10 and 11 are semi-diagrammatic views considerably enlarged to illustrate certain features of the apparatus shown in Figure 1.

The method and apparatus to be presently described in detail is particularly suitable for manufacturing forming rolls of the type shown in Figure 7 of the drawings and designated by the numeral 12. This forming roll comprises a drive shaft 13 and a plurality of discs 14. The discs are centrally apertured to receive the drive shaft 13, and are keyed or otherwise secured to the drive shaft for rotation by the latter. The discs 14 have central hub portions 15 of uniform axial dimension and have peripheral portions 16. The opposite side surfaces 17 of revolution of the peripheral portions 16 converge from the hub portions 15 to the outer edge of the discs 14.

The discs 14 as assembled on the shaft 13 with the hub portions 15 in contact and adjacent peripheral portions 16 cooperate with one another to provide annular grooves 18 therebetween. The number of discs 14 secured to the shaft 13 may vary to suit different conditions, but for the purpose of illustration, seven discs are shown. These discs are individually identified in Figure 7 of the drawings by the reference numerals 19 to 25 inclusive.

As disclosed in the Walter P. Hill Patent No. 2,508,518, a set of three rolls 12 are suitably supported around a length of stock or tubing, and cooperate with one another to extrude material from the outer surface of the stock to form a helically extending fin of substantial height on the stock. The rolls are supported with their axes crossing the axis of the stock at an angle depending upon the helix angle of the fin to be formed on the stock and this angle is usually small in order to provide a large number of fin convolutions per unit of length of the stock. The discs 14 on the respective rolls are in tracking relationship and the peripheral edges of at least the discs at the front ends of the rolls apply a pressure in a radially inward direction on axially spaced helically aligned portions of the outer surface of the stock. An opposite or radially outward force results from the application of said radially inward force on the stock and this outward force displaces or extrudes material from the surface portion of the stock outwardly between the axially spaced portions or into the annular grooves 18 formed by the peripheral portions of the discs.

With the above in view, attention is again called to Figure 7 of the drawings, wherein it will be seen that the first four discs 19, 20, 21 and 22 are the pressure applying or working discs; and the last three discs 23, 24 and 25 are more or less the finishing discs. The working discs 19 to 22 preferably progressively increase in diameter from the first disc 19 to the last disc 22 of this group in order to progressively displace material from the outer surface of the stock and at the same time, materially reduce the unit load on any one disc. The finishing discs 23, 24 and 25 may be practically the same diameter as the final working disc 22 since the principal function of the finishing discs is merely to guide or straighten the fin convolutions formed by the working discs.

The peripheral portions 16 of the discs 14 progressively increase in thickness from the first working disc 19 to the final working disc 22 with the result that the grooves 18 between the working discs progressively decrease in width from the first groove to the last groove. The purpose of this construction is to enable the side surfaces 17 of revolution to guide the material as it is extruded into a relatively thin high fin.

The helical fin produced with forming rolls of the above general type have adjacent convolutions closely spaced and of substantial height in comparison to the root diameter of the fin. The diameter of the discs 14 is necessarily substantially larger than the outside diameter of the fin; and in practice, the rate of withdrawal of the discs from the spaces between adjacent convolutions of the fin is somewhat different than the rate of axial movement of the stock during the fin forming operation. This being the case, the peripheral portions 16 of the discs 14 interfere with the convolutions of the fin, and the latter are actually bent backwardly and forwardly during the fin forming operation. This is objectionable in that some work hardening of the material results, and considerable stress is applied to the peripheral portions of the discs. In order to overcome the above objection, the side surfaces of revolution of at least the working discs 19 to 22 inclusive are contoured in order to pass relatively freely through the helicoidal path provided between adjacent convolutions of the fin being formed by the roll. In detail the surfaces of revolution 17 on the working discs 19 to 22 inclusive are convex and curve radially with respect to the axis of the roll. This general elliptical curvature affords ample clearance to enable withdrawal of the discs from the spaces between adjacent convolutions of the fin without appreciably bending or stressing the fin.

If desired the side surfaces of revolution of the sizing or finishing discs 23 to 25 inclusive may correspond in contour to the side surfaces of revolution of the working discs 19 to 22 inclusive. However, in the present instance, the opposite side surfaces of revolution of the sizing discs 23 to 25 inclusive are straight in radial contour as clearly indicated in Figure 7 of the drawings. Such a construction has the effect of work hardening the convolutions of the fins after they have been formed by the working discs, and in some instances, this result is desired. Inasmuch as the work hardening takes place after the fin has been formed, it does not interfere with extruding the material to form a high fin.

In the manufacture of forming rolls of the above type, it has been found that when the discs 14 are individually machined or form-ground to the specified contour without regard to their ultimate assembled relationship, any error, no matter how slight, in the grinding of single discs becomes accumulative when the discs 14 are subsequently secured together to form a roll. Although the allowable tolerances in forming individual discs may be small, nevertheless, the accumulative error over the group of discs may be sufficient to cause the discs to deform the fin during the fin forming operation. As a result such accumulative errors frequently promote work hardening of the metal during forming of the fin and cause excessive wear of the forming discs.

The foregoing is overcome in accordance with the present invention by providing a method and apparatus for manufacturing the discs characterized in that the peripheral portions 16 of all of the discs 14 are fashioned or form-ground while the discs are supported in the same relationship they subsequently assume when assembled to provide the forming roll 12. Also, as will be more fully hereinafter described, the roll discs 14 are fashioned so that when they are assembled the median planes P of the hub portions 15 of adjacent discs 14 are spaced equal distances from one another regardless of any variation in thickness of the peripheral portions 16 of the individual discs. The planes P shown in Figure 7 of the drawings are perpendicular to the roll axis and pass through the axial centers of the tips of the discs 14. Thus, the grooves 18 are accurately located with respect to each other axially of the roll so that little or no axial stress is applied to the material being extruded into the grooves 18. Also, when a plurality of rolls 12 are distributed about a length of tubing, the grooves 18 accurately track and the desired helically extending fin is produced with a minimum amount of resistance.

The various steps of the method of manufacture will be more readily understood upon considering one specific form of apparatus capable of carrying out the steps of the method. With this in view, reference is made more in detail to Figure 1 of the drawings, wherein the numeral 30 designates a pantograph form grinder having a work holding assembly 31 and having a forming tool assembly 32. The work holding assembly 31 comprises a base 33 and a compound slide 33' suitably supported on the base. The compound slide 33' has two slides 34 and 34'. The slide 34 is adjustable relative to the base 33 in a longitudinal direction and the slide 34' is adjustable relative to the slide 34 in a direction extending transverse to the direction of movement of the slide 34. Suitable hand operated controls 35' and 35'' are respectively connected to the slides 34 and 34' in a manner shown in Figures 2 and 6 of the drawings for independently adjusting the slides.

A spindle 35 is journalled in a bearing 36 suitably secured to the slide 34 in a manner such that the axis of the spindle extends in the direction of movement of the slide 34. The front end of the spindle 35 is coupled to the drive shaft of an electric motor 37, and a suitable bracket 38 is provided for securing the motor on the slide 34. The rear end of the spindle is provided with a center 38', which cooperates with a center 37' to support an arbor 39. The center 37' is mounted on a bracket 40 in axial alignment with the center 38', and the bracket 40 is suitably secured to the slide 34. The bracket 40 has a bearing part 40' within which the center 37' is supported for sliding movement in the direction of its axis and a suitable hand operated control 41 is provided for sliding the center 37'. The arrangement is such as to permit the arbor 39 to be readily inserted between and removed from the centers. The arbor 39 is rotated as a unit with the spindle 35 by means of a pin or lug 41' extending from the rear end of the spindle in a position to engage a flat 42 (Figure 8) on the adjacent end of the arbor 39.

The arbor 39 is shown in Figure 8 of the drawings as having a cylindrical part 44 projecting rearwardly from the head 43. The front side of the head 43 is fashioned with a recess at the center for receiving the center 38' on the rear end of the spindle 35, and the rear end of the part 44 has a reduced threaded portion 45 which also has a recess at the end thereof for receiving the center 37'.

The purpose of the arbor 39 is to support a plurality of disc blanks 46 in operative relation to the forming tool 32. The disc blanks 46 are centrally apertured and are sleeved on the part 44. The first or forwardmost blank is seated against a stop in the form of an annular bearing surface 47 on the head 43 of the arbor, and spacer rings 48 are supported on the part 44 of the arbor between adjacent blanks in order to provide sufficient clearance between the blanks for the grinding disc 52. All of the disc blanks 46, together with the spacers 48, are clamped in assembled relationship against the head 43 by a cap 49 sleeved upon the rear end of the part 44 in a position to engage the rear side of the last disc blank and held in place by a nut 50 threaded on the portion 45 of the part 44.

The number of disc blanks 46 on the arbor 39 corresponds to the number of preformed discs 14 employed to form the roll 12, and in the present instance seven disc blanks are shown. These disc blanks are individually indicated in Figure 8 of the drawings by the reference numerals 19' to 25' inclusive, and these blanks respectively correspond to the preformed discs 19 to 25 inclusive. The disc blanks 46 are rotated as a unit with the arbor 39; and for accomplishing this result, the cylindrical part 44 is provided with a longitudinally extending key 51 which extends into registering key slots formed in the respective disc blanks.

The forming tool assembly 32 comprises a grinding wheel disc 52 secured to the front end of a spindle 53, and rotatable by the spindle in a plane normal to the axis of the arbor 39. The grinding wheel disc 52 is relatively thin, and is located by the spindle in a position opposite the arbor 39. The spindle 53 is driven by an electric motor 54 which in turn is supported on a slide 55. The slide 55 is supported for movement in opposite directions normal to the axis of the arbor in order to permit movement of the grinding wheel disc 52 in directions toward and away from the arbor axis.

As shown particularly in Figure 5 of the drawings, the slide 55 is mounted on a second slide 56 supported on the frame of the machine for movement in opposite directions parallel to the axis of the arbor 39. Thus the grinding wheel disc 52, in addition to being movable toward and away from the axis of the arbor 39, is also capable of being moved along the axis of the arbor. Such movement of the grinding wheel 52 relative to the arbor enables engaging the grinding wheel with opposite sides of the peripheral portions of successive disc blanks 46 on the arbor.

In accordance with the present invention, the path of movement of the grinding wheel discs 52 relative to the arbor 39 is controlled by a master cam or template 57. As shown particularly in Figures 1 and 3 of the drawings, the master template 57 comprises a flat strip positioned on the machine frame by pins 58 and removably secured to the frame by suitable fastener elements 59. The template 57 is spaced some distance from the arbor 39 and extends in the same direction as the axis of the arbor.

The inner edge of the template 57 is provided with a series of lateral projections 60 which are spaced from each other in the direction of length of the template and correspond in number to the number of preformed discs 14 employed to form the roll 12. In the present instance seven projections are provided on the cam, and these projections are individually identified by the numerals 19" to 25" inclusive. The projections 19" to 25" respectively correspond to the peripheral portions 16 of the preformed discs 19 to 25 inclusive, and the edges or the profile of the projections are accurately formed to correspond exactly to the contour of the peripheral portions 16 of the respective discs 14. The size of the projections 60, however, is preferably many times greater than the size of the peripheral portions 16 of the discs 14 in order to facilitate manufacture. For the purpose of this illustration, the actual size of the projections 60 on the cam or template 57 is six times the size of the peripheral portions of the discs 14. Also in the interests of convenience in manufacture, the space between adjacent projections 60 is a multiple of the space betwen adjacent disc blanks 46; and in the present instance, the space between adjacent projections 60 is six times greater than the space between adjacent disc blanks 46.

The master cam or template 57 is engaged by a follower 61 in the form of a pin, and the pin is in turn connected to the grinding wheel disc 52 by a pantograph arrangement of linkage designated generally by the reference numeral 62. The pantograph arrangement of linkage 62 connects the master cam or template 57 to the grinding disc 52 with a ratio of six to one. In other words the grinding wheel disc is moved throughout the path dictated by the master template at a rate which is ⅙ the rate of movement of the follower 61 along the template with the result that the grinding wheel disc successively engages opposite sides of the peripheral portions of the blanks 46 on the arbor 39.

In detail the follower 61 is supported on the lower end of a link 63 and the upper end of the link 63 is pivoted by a pin 64 to the upper end of a link 65. The link 65 is the same length as the link 63, and is pivoted at its lower end to a bracket 66 rigidly fixed on the machine frame. The link 63 is connected to the slide 55 by a link 68 positioned at the inner side of the link 65 in parallel relation to the latter and having one end pivoted to the link 62 by a pin 69. The other end of the link 68 is pivoted by a pin 70 to the slide 55 and to the inner end of a short link 71 having the outer end pivoted by a pin 72 to the link 65. The distance between the axes of the pins 70 and 72 is equal to the distance between the axes of the pins 64 and 69. Also, the distance between the pivot pins 64 and 72 is the same as the distance between the pins 69 and 70, with the result that a parallelogram is formed. In addition it will be noted that the distance between the pivot pins 74 and 69 is equal to one sixth the length of the link 63. As a consequence, movement of the follower 61 in and out relative to the master cam 57 moves the grinding wheel 52 or slide 55 through the medium of the parallelogram linkage previously described in corresponding directions at a rate one sixth the rate of movement of the follower 61. Likewise any displacement of the follower 61 back and forth along the master cam 57 causes the parallelogram linkage to apply a side thrust on the slide 55 which is transmitted to the slide 56. Thus the slide 56 moves the grinding wheel 52 or slide 55 back and forth along the arbor 39 at a rate one sixth the rate of movement of the follower 61 relative to the cam 57.

The numeral 75 in Figure 1 of the drawings designates a dressing device for the periphery of the grinding wheel 52. Briefly, the dressing device 75 is supported on the machine frame at the side of the grinding wheel spindle 53 opposite the side occupied by the arbor 39. The device 75 comprises a slide 76 and a dressing tool 77. The slide 76 is supported on the machine frame for movement toward and away from the grinding wheel spindle 53; and the tool 77 is supported for rotation in a plane normal to the plane of rotation of the grinding wheel 52. The slide 76 is movable toward and away from the periphery of the grinding wheel 52 by a hand wheel 78 mounted on the outer side of the machine frame in a position where it may be conveniently manipulated by the operator.

The dressing tool 77 is positioned to require movement of the grinding wheel 52 forwardly and outwardly from its normal operating position relative to the arbor 39 in order to bring the periphery of the wheel 52 in operative relation to the tool 77. Movement of the wheel 52 to its dressing position is facilitated by providing a hole 79 in the machine frame for engagement with the follower pin 61. In this connection it will be noted that the pin 61 is slidably supported on the outer end of the link 63 to permit dropping the same into the hole 79. The hole 79 is so located that when the linkage 62 is operated by placing the follower 61 into the hole 79, the grinding wheel 52 is moved from its normal position shown by the full lines in Figure 1 to the dressing position shown by the broken lines in the same figure. After the grinding wheel 52 is located in its dressing position, the hand wheel 78 is manipulated to bring the point of the tool 77 into engagement with the periphery of the grinding wheel and the tool 77 is alternatively rotated in opposite directions by a hand operated control 80 to dress the periphery of the wheel 52. The dressing device and the means for operating the same is merely diagrammatically illustrated herein as this invention is not concerned with the details of construction of the same.

Operation

The first step in the operation after an arbor 39 with a set of disc blanks 46 is supported on the centers 37' and 38', is to rest the follower 61 on the extreme inner edge of the first master cam projection 19". This movement of the follower 61 through the linkage 62 shifts the grinding wheel 52 rearwardly and inwardly relative to the arbor 39 to locate the periphery of the wheel 52 in registration with the first disc blank 19' on the arbor 39. The compound slide of the work holder assembly 31 is then adjusted relative to the grinding wheel disc 52 to bring the periphery of the wheel 52 into grinding contact with the periphery of the first disc blank 19' and the first disc 19' is ground to the desired diameter.

Upon completion of the above operation, the follower 61 is shifted to the broken line position shown in Figure 1 and the work holder 31 is again adjusted until the front side of the wheel 52 sparks against the rear side of the first disc 19'. The arbor 39 and grinding wheel 52 are then in their proper relative positions and the follower 61 is manually moved successively along the profiles of the cam projections 19" to 25". Owing to the pantograph linkage connection 62 between the follower 61 and the grinding wheel 52, the latter successively engages opposite sides of the disc blanks 46 and forms the peripheral portions of the blanks to the exact profile contour of the cam projections 60. This operation is illustrated in the exaggerated views (Figures 10 and 11 of the drawings) and attention is called to the fact that the disc blanks 46 and cam projections 60 are axially spaced relative to each other so that the planes P between the opposite side surfaces of the hub portions 15 of adjacent discs 14 of the roll 12 are predeterminedly spaced, or in the present instance, are spaced equal distances from one another regardless of any variations that may exist in the thickness of the peripheral portions 16 of the discs 14. As a result when the rolls 12 are distributed around a length of tubing the grooves 18 are arranged in accurate tracking relationship and material is extruded from the tubing by the roll discs 14 with a minimum amount of resistance.

It will be apparent from the above that the peripheral portion of each disc blank on the arbor is ground to the exact contour of its corresponding cam projection on the master cam 57. The profile contour of the cams 19" to 25" in turn respectively corresponds to the predetermined contour of the roll discs 19 to 25 so that upon completion of the grinding operation on the blanks 19' to 25' inclusive, one complete set of roll discs 14 is provided. These discs are then removed from the arbor 39, and are assembled as shown in Figure 7 of the drawings on the shaft 13 in the same sequence they previously occupied on the arbor 39. Thus when a plurality of rolls 12 formed in the above manner are grouped around a length of stock to be finned, the spacing between adjacent side surfaces of revolution of corresponding discs of the rolls in the group is the same and fins of substantial height may be more accurately extruded from the periphery of the stock with the minimum stress applied to the individual discs.

Also with the above method and apparatus one or more of the preformed discs 14 may be replaced without destroying the accuracy of the relationship described in the preceding paragraph. Assuming for the purpose of illustration that it is desired to replace the forming disc 22 of the roll 12, all of the discs 14 are removed from the shaft 13 and with the exception of the disc 22 are assembled in the same sequence on the arbor 39. A disc blank 22' is substituted for the preformed disc 22 and the grinding operation described above is repeated. During this grinding operation the blank 22' is fashioned to the contour of the disc 22 and the amount of stock removed from the discs 19, 20, 21, 23, 24 and 25 is sufficient only to insure obtaining the desired relationship between the discs when they are again assembled on the roll shaft 13.

What I claim as my invention:

1. A fin forming roll comprising a plurality of individual discs, each disc provided with a central hub portion and with a surrounding portion having the opposite side surfaces converging toward the periphery of the disc, said discs being secured together in axial alignment with the hub portions of adjacent discs in contact and with the side surfaces of adjacent discs spaced axially from each other to form annular spaces therebetween, the surrounding portions of the discs progressively increasing in thickness to provide the annular spaces between adjacent discs with progressively decreasing widths and the median planes between the side surfaces of adjacent discs being spaced equal distances from one another.

2. The fin forming roll defined in claim 1 in which the side surfaces of each disc are convex on a curve which extends radially outwardly from the hub portion of the disc to the outer edge of said disc.

3. A fin forming roll comprising a series of discs secured in coaxial relationship with the central portions of the discs in side by side relation, said discs having fin forming portions surrounding the central portions and having the opposite side surfaces of the fin forming portions converging from the central portions of the discs to the tips at the periphery of the discs, said fin forming portions progressively increasing in width from the first disc to the last disc in said series to provide annular spaces between adjacent discs which progressively decrease in width from the first annular space to the last annular space, the median planes of the central portions of the discs extend perpendicular to the axis of the roll and respectively pass through the tips at the periphery of the discs midway between opposite sides of the tips, and the median planes of adjacent discs being spaced equal distances from one another axially of the roll.

4. The fin forming roll defined in claim 3 wherein the central portions of the discs are of uniform width and wherein the central portions are secured together with adjacent surfaces in abutting relationship.

5. The fin forming roll defined in claim 3 wherein the opposite side surfaces of the fin forming portions are convexedly curved throughout substantially the full radial extent of said surfaces.

6. The fin forming roll defined in claim 5 comprising a second series of discs having central portions coaxially arranged with respect to the central portions of the first series of discs and having finishing portions surrounding the central portions, the finishing portions having the opposite side surfaces respectively lying in planes which converge from the central portions of the discs to the tips of the latter to provide annular fin receiving grooves between adjacent discs, the median planes of the discs in the second series extend perpendicular to the roll axis and pass through the tips midway between opposite sides of the latter, and the distance between the median planes of adjacent discs in the second series being substantially the same as the distance between the median planes of adjacent discs in the first series.

WALTER P. HILL.

References Cited in the file of this patent

UNITED STATES PATENTS

| Number | Name | Date |
|---|---|---|
| 1,909,005 | Paugh | May 16, 1933 |
| 2,429,491 | Schuler | Oct. 21, 1947 |